United States Patent [19]

Rabian

[11] Patent Number: 4,980,533
[45] Date of Patent: Dec. 25, 1990

[54] METHOD AND APPARATUS FOR ELECTROEROSIVE CUTTING

[76] Inventor: Laszlo Rabian, Casard 35, CH-1023 Crissier, Switzerland

[21] Appl. No.: 297,852
[22] PCT Filed: May 19, 1988
[86] PCT No.: PCT/CH88/00095
 § 371 Date: Nov. 23, 1988
 § 102(e) Date: Nov. 23, 1988
[87] PCT Pub. No.: WO88/09238
 PCT Pub. Date: Dec. 1, 1988

[30] Foreign Application Priority Data

May 22, 1987 [SE] Sweden .................. 2004/87

[51] Int. Cl.$^5$ .................. B23H 1/06; B23H 7/24; B23H 7/32
[52] U.S. Cl. .................. 219/69.14; 219/69.17; 204/238; 204/129.5; 204/129.7; 204/224 M
[58] Field of Search ............ 204/129.5, 129.7, 129.75, 204/224 M, 129.6, 129.43, 225, 238; 219/69.17, 69.18, 69.14, 69.15

[56] References Cited

U.S. PATENT DOCUMENTS

| | | | |
|---|---|---|---|
| 3,371,022 | 2/1968 | Inoue | 204/129.7 X |
| 3,403,085 | 9/1968 | Berger et al. | 204/129.7 X |
| 3,810,829 | 5/1974 | Fletcher | 204/129.7 X |
| 3,928,154 | 12/1974 | Andrews | 204/129.6 X |
| 4,289,947 | 9/1981 | Inoue | 204/129.6 X |
| 4,414,456 | 11/1983 | Inoue | 204/129.6 X |
| 4,599,154 | 7/1986 | Bender et al. | 204/129.6 |

FOREIGN PATENT DOCUMENTS 60-90630 9/1985 Japan.
755826 8/1956 United Kingdom.

Primary Examiner—Donald R. Valentine
Attorney, Agent, or Firm—Herbert Dubno

[57] ABSTRACT

Electroerosion, spark discharge erosion is carried out by effecting a spark discharge between a jet of a conductive flowable medium forming the electrode and a workpiece. The shape of the electrode jet is imparted to the flowable medium from the nozzle at which the jet emerges at high velocity.

11 Claims, 2 Drawing Sheets

METHOD AND APPARATUS FOR ELECTROEROSIVE CUTTING

CROSS REFERENCE TO RELATED APPLICATIONS

This application is a National Phase application of PCT/CH88/00095 filed May 19, 1988 and based upon Swiss application No. 2004/87 May 22, 1987.

FIELD OF THE INVENTION

My present invention relates to an electrode for electroerosive cutting of workpieces by means of at least one electrode, the electrode and the workpiece being separated from each other by a working gap and an erosion generator supplying the working current.

BACKGROUND OF THE INVENTION

As is known, an electrode for electroerosive cutting can be a thin wire having a diameter which lies in the range of 0.02 to 0.35 mm. During the cutting process the wire is unwound from a supply bobbin. Within a complicated mechanism which is located above and beneath the workpiece, the wire electrode is deviated and tensioned. The tension may be for example, 16 Newton. Furthermore diamond and sapphire guides for strictly maintaining the position of the wire electrode are provided in the mechanism and, in particularly during conical cutting, apply high friction to the wire electrode so that the latter is tensioned up to its tensile strength.

The working current which is up to several hundred amperes per pulse at repetition frequencies of up to 250 kHz, is applied to the thin wire electrode by means of thin wiper contacts. The transition areas for the working current are very small. Due to the rise in temperature as a result of the high working current the areas in the dielectric insulator in which the specific erosion process between the workpiece and the wire electrode takes place must be cooled. The disadvantage of this cooling is that the areas for the current transition are subjected to electroerosion, too, which leads to their early destruction.

In addition, the areas for the current transition increase the friction on the wire electrode. During the erosion process the known wire electrode is adversely affected by the following forces in the working gap: electrostatic forces, spark discharge forces as well as mechanical forces arising from the flow of the dielectric fluid and from gas bubbles. These forces in the working gap create undesirable vibrations of the wire electrode which lie in the range of the natural frequency of the tensioned wire electrode of approximately 1 kHz. This lowers the efficiency of the erosion process by a factor of 2 to 3. A further disadvantage resides in the fact that on the known wire electrode material is removed in an undesirable manner (electrode wear) due to the spark discharge in the working gap. This leads to an additional reduction of the diameter of the thin wire electrode. This disadvantage cannot even be compensated by a higher feed velocity of the wire electrode because that velocity is greatly restricted by the characteristics of the material such as, for instance, the elasticity modulus of the wire electrode.

In addition the wire electrode, already stressed to its limit by the above mentioned effects, will be torn apart by unpredictable troubles in the erosion process, e.g. short circuits and arc discharges.

OBJECT OF THE INVENTION

It is an object of the invention to overcome these deficiencies of the known wire electrodes and in addition to adapt itself in a flexible manner to the actual working process.

SUMMARY OF THE INVENTION

The object is achieved by constituting the electrode as a jet of a medium of high electric conductivity, the jet emerging from a nozzle under pressure and being shaped by the cross-section of said nozzle. The medium can be in a liquid, gel-like, paste-like or powderous state or in a combination of said states.

Advantageously the nozzle generating the jet is arranged in the vicinity of the one surface of the workpiece and a basin collecting the medium is arranged in the vicinity of the other surface of the workpiece. The mouthpiece of the nozzle can be arranged at a small adjustable distance to one surface of the workpiece. The nozzle imparts a predetermined cross-section to the jet emerging from the mouthpiece, the cross-section remaining unchanged during the passage of the jet through the working gap. A number of such nozzles can be arranged above the one surface of the workpiece, at least one of said nozzles being movable into a working position. The nozzles can have the same or different cross-sections or shapes.

At least one such nozzle can be arranged on a presurre vessel for receiving the medium. The nozzle on the pressure vessel can be movable into a working position or an inoperative position and that the outflow of the medium can be controlled by means of a sealing device. The pressure vessel can be of cylindrical shape and can be rotatable. the sealing device can comprise an elastic lining with a slot, the lining being connected to a floating body in such manner that the nozzle in its working position is connected to the medium in the pressure vessel through the slot.

The electric conduit for the working current supplied by the erosion generator can be connected to the nozzle over a great area.

The aperture of the collecting basin can be arranged at a small distance to the other surface of the workpiece and at least a deviation area or at least a deviation channel disposed within the collecting basin can deviate the jet emerging from the working gap in order to eliminate its kinetic jet energy.

The medium collected in the collecting basin can be cleaned in a processing device for re-use and is pumped by means of a pump into the pressure vessel of the nozzle.

BRIEF DESCRIPTION OF THE DRAWING

The above and other objects, features and advantages of my invention will become more readily apparent from the following description, reference being made to the accompanying highly diagrammatic drawing in which.

DETAILED DESCRIPTION

Figure 1:
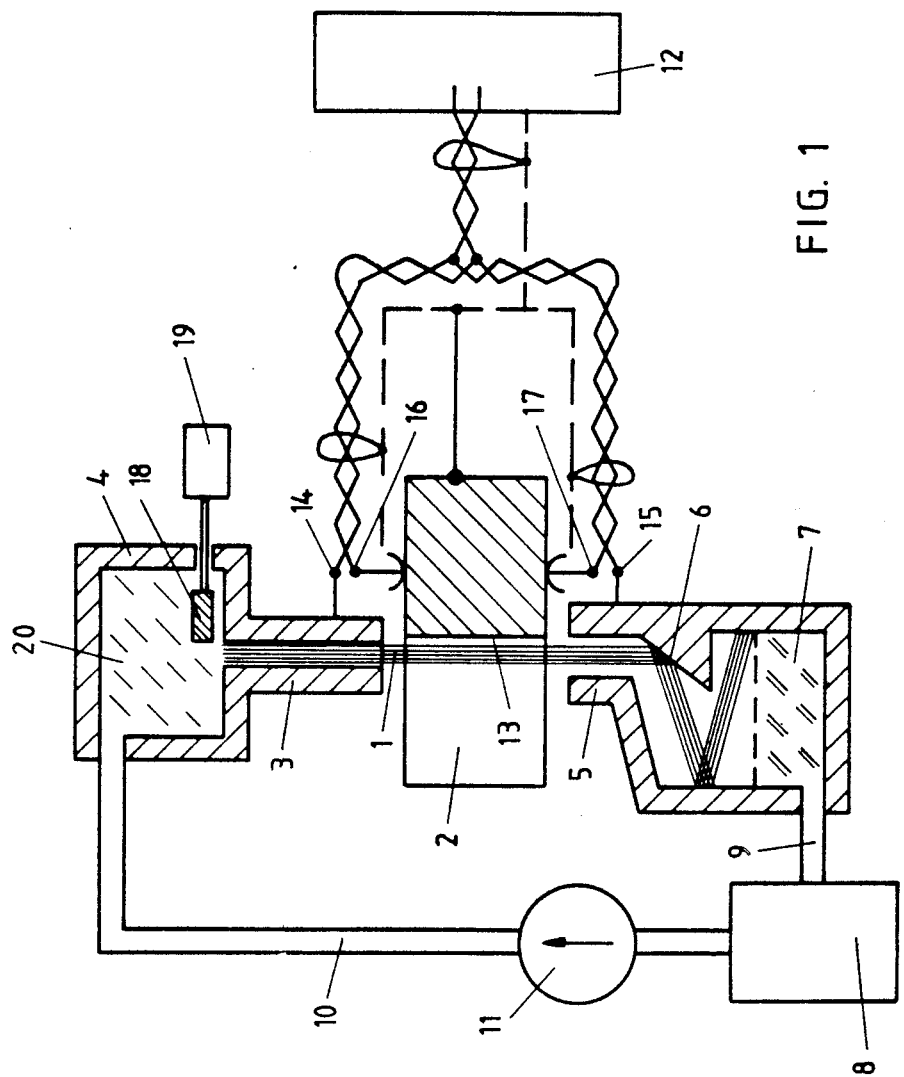
FIG. 1 is a cross section of the entire cutting plant with a first embodiment of the inventive electrode.

FIG. 1 illustrates an electrode 1 according to the invention which leaves nozzle 3 and flows through working gap 13 of workpiece 2 into collecting basin 5. Nozzle 3 is connected to pressure vessel 4 which contains the liquid or powderous medium 20. Medium 20 may consist of mercury or graphite powder or may be a liquid polymer. Such polymers are also called conjugated polymers possess a very good electric conductivity. Medium 20 may also be composed of compounds of mercury with diffusing metals such as e.g. copper, chromium, silver or the like. Further medium 20 may consist of compounds of mercury with metals dissolving themselves in mercury such as e.g. tantalum or the like.

Medium 20 may have a liquid, a powderous, a gel-like or a paste-like consistency or a combination of these characteristics.

In the present embodiment medium 20 will be mercury. This medium is pumped under pressure by means of a pump 11 into pressure vessel 4 and may leave through nozzle 3 if closure device 18, 19 opens. The interior of nozzle 3 is shaped in such a way that the jet electrode leaving nozzle 3 has the desired cross-section. This cross-section may be circular, elliptic, triangular, square, rectangular or polygonal. The shape of the cross-section depends upon the individual requirements called for during the erosive cutting of workpiece 2.

The closure device consists of an activator 19 which operates a slide 18 so that the opening to nozzle 3 can be opened or closed. Jet 1 leaves the nozzle with a very high velocity so that it maintains its shape on its way through working gap 13 of workpiece 2 until reaching collecting basin 5 and will not be influenced in the working gap itself by the mechanical and electric forces prevailing there. The velocity is approximately in the range of 2 to 20 m/sec. These data are valid for mercury only. For the other compounds of medium 20 the discharge velocity of jet 1 is higher because these other compounds have a smaller specific weight. This velocity therefore has a certain relation to the specific weight of medium 20 presently used. The transport velocity of the inventive jet electrode 1 is one hundred times higher than that known wire electrodes. This high velocity of jet electrode 1 brings about an advantage which will be explained in the following. As is known, voltage for electroerosive working is applied to the electrode and the workpiece. This is represented in FIG. 1 by erosion generator 12. This generator supplies pulses, voltage, current, relation of pulse duration to interval etc., necessary for the erosion process. Since these facts are known, no further attention will be given to them.

According to FIG. 1 the electric connection between generator 12 and the electrode on one hand and the workpiece on the other hand consists of a bifilar coaxial cable. One pole of the cable is connected to the electrode at contact 14. The other pole of the cable is connected to contact 16 of workpiece 2. Furthermore collecting basin 5 is connected via contact 15 to the first pole of this supply cable.

Due to the very high transport velocity of jet electrode 1 through working gap 13 of workpiece 2 the discharge channels of the sparks between the surfaces of electrode 1 and workpiece 2 become longer and their cross-section is diminished. Because of this smaller cross-section the discharge energy becomes more concentrated and thus is able to break more material out of the surface of workpiece 2. In this manner the efficiency of the electroerosive cutting is improved because the removal of material has increased in comparison to the conventional wire electrodes.

Collecting basin 5 into which the high-velocity jet 1 of the inventive electrode flows, is arranged below workpiece 2. Since this jet has a very high kinetic energy, it will be deviated by inclined area 6 and collects itself in reservoir 7 disposed at the bottom of collecting basin 5.

In FIG. 1 only one inclined area 6 is represented, but of course a number of such areas may be provided which destroy the high kinetic energy. It also may be conceivable to provide one or a number of channels for the same purpose. The mercury in reservoir 7 is transported via discharge pipe 9 to processing device 8. In this device a known filter, e.g. a centrifugal filter or a liquid filter, may be arranged which filters undesired particles out of the mercury. After this cleaning process the mercury is pumped back to pressure vessel 4 by means of pump 11. If other kinds of medium 20 are used, as mentioned above, a centrifugal or other filter may be installed in processing device 8.

Reference may be made to the fact that the distance between the mouthpiece of nozzle 3 and the surface of workpiece 2 can be increased or reduced according to the requirements.

Figure 2:
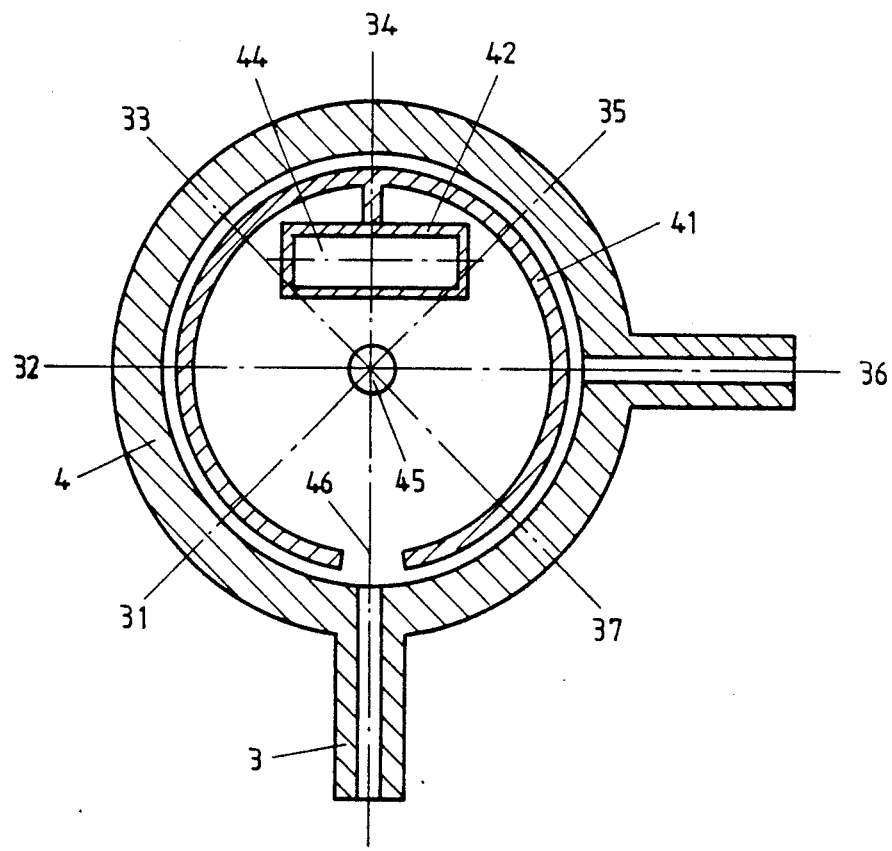
FIG. 2 is a cross section of the second embodiment.

FIG. 2 shows the second embodiment, providing a number of nozzles 3 on one pressure vessel 4. Only two of these nozzles are represented. The other ones may be arranged in the positions numbered 31, 32, 33, 34, 35 and 37. Pressure vessel 4 has a cylindrical shape and can rotate about its own axis. Inlet 45 is connected to pump 11 via pipe 10. The interior wall of pressure vessel 4 is covered with a lining that consists of elastic material and has a slotted aperture 46. This aperture passes across the entire length of the lining. Diametrally across of this aperture there is a floating body 42 rigidly connected to lining 41. Within the floating body there is a hollow space 44. The purpose of the floating body is to float in medium 20 and to continuously maintain, due to its buoyancy forces, the upright position of slot 46 at all times. Only at the location of slot 46 can a nozzle 3 be supplied with medium 20. The other nozzles are closed. Due to the pressure exerted by medium 20 onto lining 41 the latter is pressed onto the cylindrical surface of pressure vessel 4 so that the closed nozzles are hermetically sealed. Only the nozzle pointing downwards is able to create jet 1 of the electrode and thus carry out the electroerosive cutting. The lower nozzle is in working position, the other nozzles are in the inoperative position. The embodiment of FIG. 2 constitutes a multiple tool. Each nozzle may have another cross-section and/or or another diameter. Depending upon the requirements of the actual eroding process the most favourable nozzle can be brought into the working position. This is effected by reducing the pressure in pressure vessel 4 down to zero so that lining 41 separates from the interior surface of pressure vessel 4. Afterwards cylindrical pressure vessel 4 is rotated to such an extent that the nozzle having the desired cross-section and the desired shape comes into the working position. Then full pressure onto the pressure vessel is restored again. Those nozzles that are in the inoperative position are again sealed by lining 41.

In connection with FIGS. 1 and 2 it is to be mentioned that nozzles 3 in working position need not always be directed vertically downwards in their working position, so as to be at right angles to the surface of workpiece 2. The pressure vessels 4 of both embodiments may be rotated such that the nozzles 3 are at an angle in the range of 0° to 50° to the surface of the workpiece. The working position of the nozzle includes that range. Such an oblique position of the nozzle will be necessary if jet electrode 1 must make a conical cut in workpiece 2. Pressure vessel 4 of FIG. 1 is suspended in a rotating device that is not particularly represented. The pressure vessel must only be turned into the respective angular position. Pressure vessel 4 of FIG. 2 is arranged in a rotatable manner. However, the geometrical allocation of slot 46 to floating body 42 of lining 41 must be altered here so that the slot assures the supply of nozzle 3 with medium 20 within the range stated above.

Even if FIGS. 1 and 2 disclose only one nozzle 3 in working position, several nozzles may be provided whose jet electrodes 1 cut commonly and simultaneously into the same workpiece 2.

I claim:

1. An apparatus for effecting electroerosive cutting a workpiece, comprising:
   a pressure vessel formed with at least one nozzle;
   means for supplying under pressure a flowable medium adapted to form an electrode jet upon emergence from said nozzle;
   a means for positioning a workpiece adjacent said jet so that said jet forms an electrode juxtaposed with said workpiece across a dielectrode filled cutting gap; and
   means connected across said workpiece and said nozzle for supplying electroerosive pulses across said gap to remove workpiece material by electroerosion, said nozzle being movable into a working position by displacement of said pressure vessel and said pressure vessel having a sealing device controlling outflow of said medium in accordance with the position of said pressure vessel.

2. The apparatus defined in claim 1 wherein said pressure vessel is cylindrical and is rotatable about an axis of said vessel, said sealing device comprising an elastic lining in said pressure vessel having a slot adapted to communicate with a nozzle formed on said vessel, said elastic lining being connected to a floating body whose buoyancy controls the position of said slot relative to a nozzle of said pressure vessel.

3. An apparatus for effecting electroerosive cutting a workpiece, comprising:
   a pressure vessel formed with at least one nozzle;
   means for supplying under pressure a flowable medium adapted to form an electrode jet upon emergence from said nozzle;
   a means for positioning a workpiece adjacent said jet so that said jet forms an electrode juxtaposed with said workpiece across a dielectrode filled cutting gap;
   means connected across said workpiece and said nozzle for supplying electroerosive pulses across said gap to remove workpiece material by electroerosion, said nozzle being positioned along one side of said workpiece; and
   a collecting basin arranged at a small distance from an opposite side of said workpiece and having a deviation means intercepting said jet after it passes said workpiece for deflecting said jet as said medium passes into said collecting basin to eliminate kinetic energy of said jet.

4. A method of electrodischarge machining of a workpiece which comprises the steps of:
   (a) projecting a jet of an electrically conductive flowable medium from a nozzle to a collecting basin spaced from said nozzle so that said jet substantially retains its cross section all along a path between said nozzle and said collecting basin;
   (b) juxtaposing a workpiece machinable by electrical discharge machining with said jet across a machining gap filled with a dielectric liquid;
   (c) relatively displacing said jet as a machining electrode and said workpiece to maintain said gap during machining of said workpiece; and
   (d) applying electrical pulses across said gap to machine said workpiece against said jet as said electrode, said medium emerging from said nozzle under high pressure and high velocity and being shaped in cross section by a cross section of said nozzle, said medium being selected from the gap which consists of a liquid, a gel-like medium, a paste-like medium, a powder stream and combinations thereof.

5. The method defined in claim 4 wherein said nozzle is arranged close to one surface of said workpiece and said basin is arranged close to an opposite surface of said workpiece.

6. An apparatus for effecting electroerosive cutting a workpiece, comprising:
   a pressure vessel formed with at least one nozzle;
   means for supplying under pressure a flowable medium adapted to form an electrode jet upon emergence from said nozzle;
   a means for positioning a workpiece adjacent said jet so that said jet forms an electrode juxtaposed with said workpiece across a dielectrode filled cutting gap; and
   means connected across said workpiece and said nozzle for supplying electroerosive pulses across said gap to remove workpiece material by electroerosion.

7. The apparatus defined in claim 6 wherein said nozzle is arranged close to one surface of said workpiece, a collecting basin for receiving said medium being arranged close to an opposite surface of said workpiece.

8. The apparatus defined in claim 6 wherein said nozzle is provided as one of a plurality of nozzles on said pressure vessel, further comprising means for selectively positioning said nozzles to act as nozzles generating said jet for the cutting of said workpiece.

9. The apparatus defined in claim 8 wherein said pressure vessel is movable to displace a selected one of said nozzles into cutting position and for relatively displacing said nozzle and said workpiece to advance a cut through said workpiece.

10. The apparatus as defined in claim 8 wherein said nozzles have different cross sections.

11. The apparatus as defined in claim 6 further comprising a filter for cleaning said medium after it passes said workpiece and a pump connected to said filter for pumping said medium from said filter back into said pressure vessel.

* * * * *